United States Patent [19]

Thompson

[11] 4,051,591
[45] Oct. 4, 1977

[54] METHOD OF ASSEMBLING FLOTATION UNITS

[76] Inventor: Thomas L. Thompson, 2231 Pomona Ave., Costa Mesa, Calif. 92627

[21] Appl. No.: 752,824

[22] Filed: Dec. 20, 1976

[51] Int. Cl.² ............................................. B23P 19/04
[52] U.S. Cl. ........................................ 29/433; 29/464; 73/322.5; 264/274
[58] Field of Search ................. 29/433, 464; 73/322.5; 264/261, 275, 274

[56] References Cited

U.S. PATENT DOCUMENTS

| | | | |
|---|---|---|---|
| 2,742,995 | 7/1973 | Confer et al. | 264/274 X |
| 2,937,022 | 5/1960 | Koller et al. | 264/275 X |
| 3,081,493 | 3/1963 | Beyer-Olsen et al. | 264/275 X |
| 3,239,928 | 3/1966 | Baker | 29/464 X |
| 3,463,843 | 8/1969 | Taylor et al. | 73/322.5 X |
| 3,740,825 | 6/1973 | Buyken et al. | 29/433 |

FOREIGN PATENT DOCUMENTS

| | | | |
|---|---|---|---|
| 121,381 | 12/1918 | United Kingdom | 73/322.5 |
| 530,224 | 12/1940 | United Kingdom | 29/433 |

Primary Examiner—Charlie T. Moon
Attorney, Agent, or Firm—Francis X. LoJacono, Sr.

[57] ABSTRACT

A method of assembling a floatation unit wherein the unit is formed of a monolithic cell including a plurality of support rods passing therethrough to support the framework of a floating structure. The supporting rods are installed after the sealed unit is formed, by threading the elongated rods from one side to the other of the cell walls. This is accomplished by use of a guide rod, a threaded support rod which is threaded between oppositely disposed, bushing members adapted to receive the support rod. The guide rod is first passed through opposing bushings engaging the support rod as it is fed back through the bushing members, the guide rod providing a means by which the support rod can freely enter the oppositely disposed, bushing member positioned within the sealed wall of the cell.

9 Claims, 8 Drawing Figures

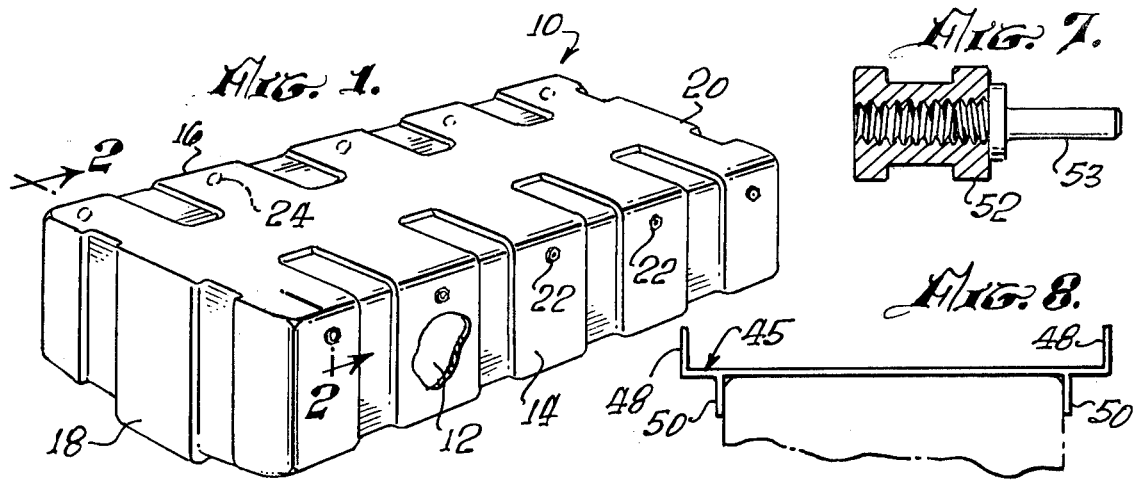
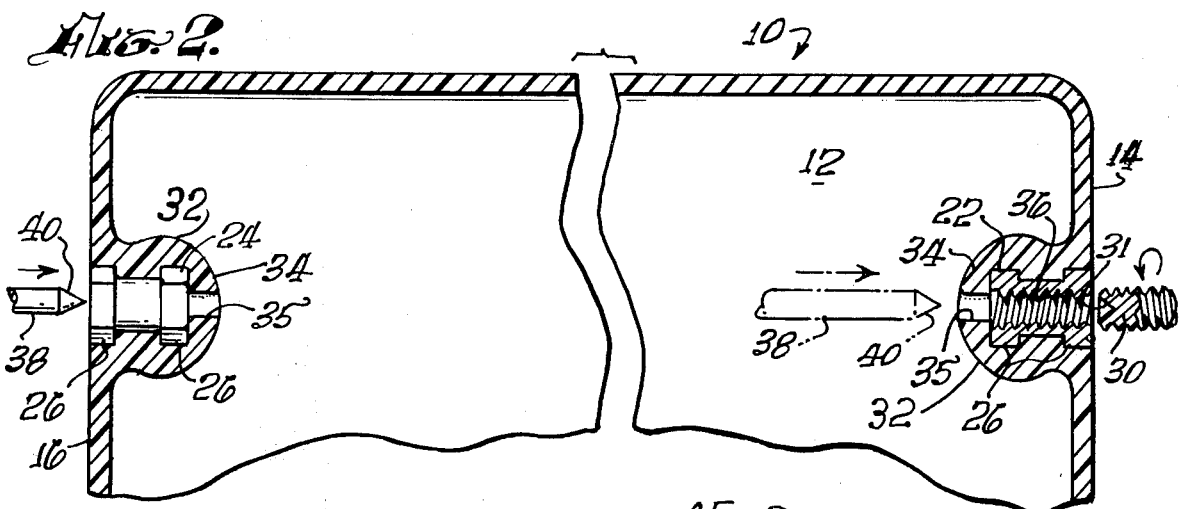
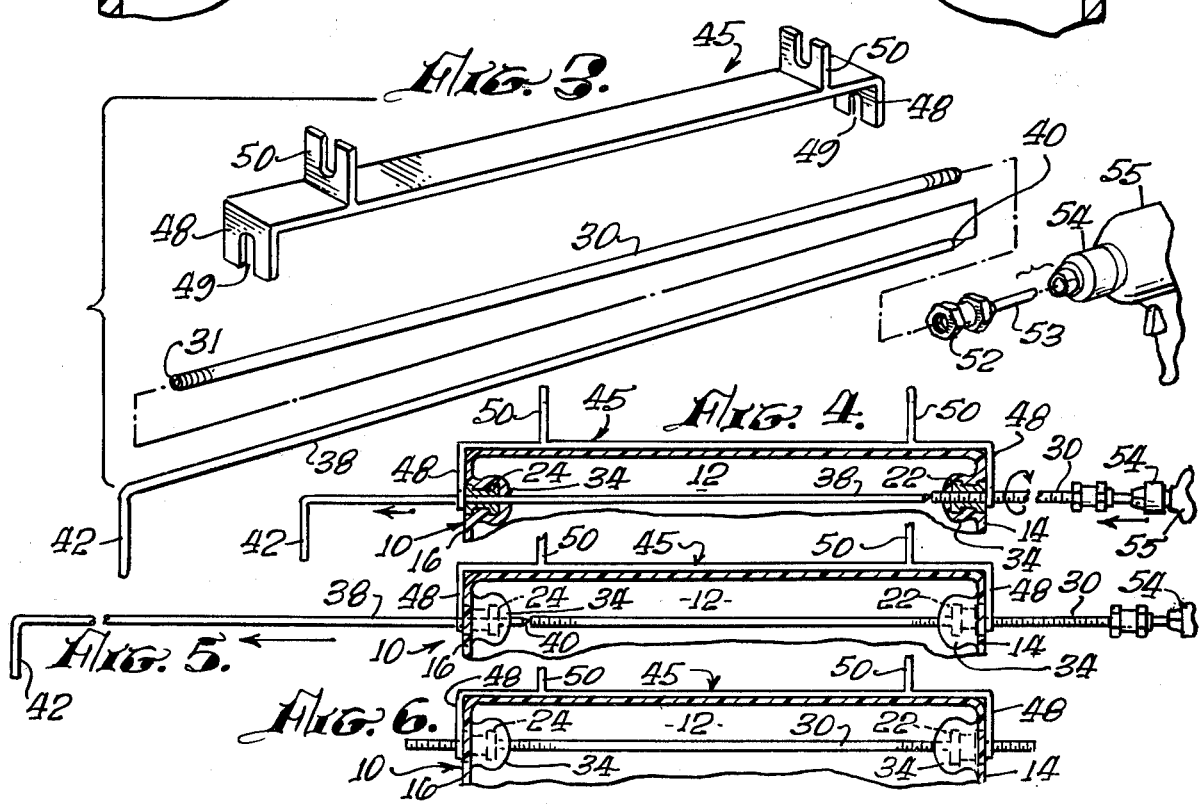

METHOD OF ASSEMBLING FLOTATION UNITS

BACKGROUND OF THE INVENTION

1. Field of the Invention

This invention relates to a monolithically constructed, sealed, floatation unit and, more particularly, to a method of assembling a plurality of support rods therethrough after the unit is formed.

2. Description of Prior Art

As is well known in the art, various types of floating docks are presently available and in use. However, each of these types of floating docks have several inherent problems and difficulties. That is, the materials used in the known devices, which have historically been used to provide buoyancy, in both salt and fresh water, have been consistently found wanting because of the marine environment—particularly with respect to those docking units that are exposed to a saltwater environment, the salt water causing a relentless deterioration of the exposed components and materials thereof.

However, a unique floatation unit formed as a monolithic cell structure has been introduced into the art. This floatation cell comprises a buoyant, sealed housing formed as a one-piece, integral unit having a substantially-rectangular, hollow, box-like configuration. This unit is molded from a high-density-polyethylene material which is well known for its strength and durability when exposed to adverse elements and conditions, such as those found in all bodies of water.

These units require support means to provide the wall structures with the needed stability when carrying the additional structural dock materials.

To provide support rods that are positioned within the sealed unit, whereby predetermined threaded ends are exposed, has been a major construction problem. That is, how does one pass a threaded, elongated rod through one wall into an opposing wall wherein the area therebetween is sealed?

The threaded support rod must be fed into a sealed, threaded bushing located in one wall and passed through the sealed cell to the oppositely-arranged, threaded bushing in the opposite wall, and threaded again through the second bushing.

In order to accomplish this task, the following method as herein described solves the above problem in a very unique yet simple manner.

SUMMARY OF THE INVENTION

This invention provides a method whereby a monolithic, hollow unit forming a sealed floatation cell can be structurally supported by a plurality of threaded rods after the unit is formed.

Accordingly, the floatation cell comprises a buoyant housing formed as a one-piece, integral unit, wherein the configuration thereof is substantially a rectangular, hollow box of a molded high-density-polyethylene material having threaded bushings embedded in opposite side walls thereof in axial alignment with each other. That is, one bushing of one wall is aligned with a matching bushing on the opposite wall. Thus, the bushings are arranged to receive a continuously threaded, support rod which is threaded into one bushing; and, as it is continuously being threaded, the rod is guided by a guide rod to automatically enter the oppositely disposed bushing, thereby interconnecting each opposing wall thereof.

During the molding process, the polyethylene completely closes the inside ends of the metal threaded bushings. After molding, a hole having a diameter less than the threaded bore of the bushing is drilled into the material covering the inner end of the bushing, to allow the threaded rods to penetrate the polyethylene wherein threads are formed therein in the process, providing a tight seal. A sizing frame is mounted to the floatation unit adjacent the bushings to receive the rod. The sizing frame prevents distortion of the side walls of the unit when applying force during the threading of the support rod. Therefore, the sizing frame is directly positioned over the top of the floatation unit with the ends thereof directly over the insert bushings.

The pointed end of the guide rod is positioned through the two inserts from one side to the other. A driving nut is secured to a drill device and is arranged to have the support rod attached thereto. The support rod includes one end having a recess to receive the pointed, free end of the guide rod. While pressure is applied to the guide rod to hold it in engagement with the support rod, the support rod is then threaded into the first bushing. As the support rod advances, the guide rod directs the free end of the threaded rod into the second oppositely disposed bushing, thereby allowing the support rod to be easily mounted through the sealed cell of the unit.

The extending ends of the rod are then adjusted to protrude to the required equal distance from the respective side walls. The extensions of each rod provide a means for attaching the wooden framework of the dock structure to a unit, or a plurality of units.

OBJECTS AND ADVANTAGES OF THE INVENTION

The present invention has for an important object a method for positioning individual support rod members through a sealed hollow unit, wherein the unit defines a monolithic cell having a plurality of aligned, oppositely-disposed bushings in which the rods are threadably mounted.

It is another object of the invention to provide a method of assembling support rods to a floatation unit wherein a guide means is first inserted and projected through each aligned bushing, to allow the support rod to be readily guided into position through the sealed cell.

It is still another object of the present invention to provide a support structure for marine-dock-floatation units wherein the units defined a monolithic, sealed floatation cell molded from a high-density-polyethylene material impervious to the elements of the marine environment.

It is a further object of the invention to provide a method of operation of this character that is simple to perform, yet allowing a rugged construction that is easy to maintain.

A still further object of the present method is to provide means whereby the unit, as a whole, can be relatively inexpensive to produce.

The characteristics and advantages of the invention are further sufficiently referred to in connection with the accompanying drawings, which represent one embodiment. After considering this example, skilled persons will understant that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a perspective view of a single, monolithic, floatation unit showing the arrangement of the threaded bushings along one wall thereof;

FIG. 2 is an enlarged, cross-sectional view taken substantially along line 2—2 of FIG. 1;

FIG. 3 is a sequential illustration of the various elements included in the operation of positioning the support rod through the floatation unit;

FIG. 4 is a cross-sectional view of the unit wherein the guide rod is shown engaging the threaded support rod after being threaded into the first bushing;

FIG. 5 is a similar, cross-sectional view thereof wherein the support rod is about to enter the second bushing;

FIG. 6 is another cross-sectional view wherein the support rod is mounted between opposite sides of the unit having equally projecting extensions;

FIG. 7 is a partial cross-section of the driving nut assembly; and

FIG. 8 is the alternative position of the sizing frame member for use with smaller sized units.

DESCRIPTION OF THE PREFERRED EMBODIMENT

Referring more particularly to the drawings, there is shown in FIG. 1 a monolithic floatation unit, generally indicated at 10, defining a hollow compartment or cell 12 having side walls 14 and 16, and end walls 18 and 20. The walls can be of any configuration but are herein shown having rib formations to provide added strength thereto. Thus, the floatation unit 10 comprises a one-piece, buoyant, substantially rectangular, box-like housing molded as a thin-walled, float unit, the unit being manufactured from a high-density-polyethylene material capable of being exposed to various adverse elements, such as sea water.

By the integral formation of all the walls, there is created an air-tight or sealed cell, or chamber 12.

When the float or unit 10 is molded, there is integrally mounted within the side walls 14 and 16 a plurality of threaded bushings 22 and 24, bushings 22 being arranged in wall 14, and bushings 24 being disposed in wall 16. Thus, each bushing 22 has a corresponding, axially-aligned bushing 24, as seen in FIG. 2.

Bushings 22 and 24 as seen in FIG. 2, include end flanges 26 wherein said flanges are embedded within the molded material of the walls—thereby preventing any rotational movement of the bushing during the threading operation of the present method. That is, the bushings are stationary to allow the continuously threaded, support rod 30 to be threaded into and through each aligned set of bushings.

As the cell 12 is formed, the bushings are completely encapsulated, as the polyethylene materials is molded, in such a manner that the entire bushing is covered, wherein a jacket 32 protrudes inwardly of the cell or chamber 12.

Due to the molding process, which is well known and not part of this invention, the inward-projecting ends of the bushings 22 and 24 are caused to be covered with a cap having an even thickness of plastic material, indicated at 34.

Accordingly, one of the basic features of the present invention includes the use of the continuously threaded rod which ties both side walls in a rigid relationship, and provides a means by which forces and stresses are transferred and absorbed by the rod itself.

Thus, the following is a description of the particular method that must be employed to allow each rod to be mounted from one bushing 22 to the oppositely aligned bushing 24.

As previously mentioned, during the molding process the polyethylene completely closes the inside ends of each bushing insert. Therefore, the firt step is to drill a hole 35 in cap 34, the hole having a smaller diameter than that of the inner diameter of the threaded bore 36, as seen in FIG. 2.

After the holes are made, a guide rod 38 having the proper outer diameter is readily passed from one wall to the other so as to project outwardly from one wall. For the purpose of better understanding the operation, the following will be described wherein the guide rod is arranged to pass through bushing 24 and hole 35, and enter the oppositely disposed bushing 22, wherein the guide rod will extend beyond wall 14. It should be indicated at this time that guide rod 38 is provided at one end with a pointed tip 40 and at the other end with a hand 42.

Once the guide rod 38 is in place, the continuously threaded support rod 30 is forceably engaged to the pointed tip 40 of guide rod 38. To provide a positive engagement, support rod 30 includes a conical recess 31 formed in one end thereof to receive the pointed tip 40. At this time, support rod 30 is rotated in a normal, threaded, clockwise direction and is forced inwardly into threaded bushing 26 against the force of guide rod 38. Thus, pressure is constantly maintained between both rods as the support rod is threaded through bushing 22 and across the sealed chamber 12 (See FIGS. 4 through 6).

It has been found that a whipping action takes place if there is no guide rod to control the traversing movement of the support rod as it travels across the cell 12. Thus, the guide rod 38 allows the free end of the support rod to enter the opposite bushing 24, first passing through holes 35 of cap 34.

It should be mentioned here that, as support rod 30 penetrates each hole 35 of the cap member 34, sealing threads are formed therebetween, providing a sealing means between the chamber and rods 30, thereby insuring a sealed floatation cell 12.

However, further detailed steps are included in the present method wherein a sizing frame is incorporated in the steps of the method, when the units are such that the forces applied thereto might distort the overall arrangement of the walls.

Accordingly, a sizing frame generally indicated at 45 is employed. This frame comprises a horizontal bar member 46 having each opposite end thereof bent doenwardly, forming arm members 48 having slots 49 disposed therein to receive the rods therethrough, as seen in FIGS. 4–6. Arms 48 are arranged to receive large width units, while a second pair of arm members 50 are secured to said bar member on the opposite side to that of arms 48. Thus, units having a smaller width are positioned between arm members 50, as illustrated in FIG. 8. It is contemplated that the large size unit will have a dimension of 42 inches. Therefore, when sizing frame 45 is positioned as shown, the penetrating force required to allow the threaded rod to enter hole 35 will not cause distortion to the floatation unit. Accordingly, sizing frame 45 is first placed directly over the top of the floatation unit, with the arms directly over each corresponding bushing.

Then, support rod 30 is threaded into a driving nut 52 having a shank member 53. The shank is adapted to be received into chuck 54 of portable drill 55 which provides the rotational means for the threaded rod 30.

After the support rod is positioned through both side walls 14 and 16, said support rod 30 is adjusted so that each end of said threaded rod projects outwardly therefrom at a predetermined distance. One way of determining the correct projecting distance is by means of a tube being cut to a specific length, said tube thereby forming a gauge which is placed over the end of the extended rod 30.

The invention and its attendant advantages will be understood from foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A method of assembing a monolithic, hollow structure comprising the steps of:
   forming a monolithic unit having a sealed chamber defined thereby;
   arranging a plurality of threaded bushing inserts in at least two oppositely disposed walls of said unit, wherein a pair of oppositedy disposed bushing inserts are axially aligned with each other;
   passing a guide rod through said bushings from one side of said unit to the other, whereby said guide rod extends outwardly from one side wall thereof;
   engaging a continuously threaded, support bar to said extended end of said guide rod;
   rotating said threaded, support bar so as to cause it to be threaded through said oppositely disposed, bushing inserts during continuous engagement with said guide rod; and
   adjusting said support rod to provide outwardly projecting ends, said ends being adjusted equidistant from said side walls thereof.

2. A method as recited in claim 1, wherein the additional step is included of mounting a sizing frame on the top of said unit wherein said unit is held from distortion during the threading of said support rod through said unit.

3. A method as recited in claim 2, wherein said side walls include a plurality of protruding jackets wherein each of said bushings is molded therein, said jackets having a sealed cap covering the inner end of said bushing, wherein the step is included of drilling a hole in said sealed cap having an inner diameter less than the outer diameter of said support rod, whereby said support rod will form threads therein.

4. A method as recited in claim 3, including the step of forming a sealing means between said protruding jacket and said threaded support rod to provide a sealed chamber therein.

5. A method as recited in claim 4 including the following steps of:
   forming a pointed tip on one end of said guide rod; and
   forming a conical recess in one end of said threaded, support rod for engagement with said pointed tip of said guide rod.

6. A method as recited in claim 5, including the steps of:
   attaching a driving nut to one end of said support rod, said driving nut having a shank portion; and
   attaching said shank portion of said driving nut to a driving means so as to rotate said support rod.

7. A method as recited in claim 6, wherein said driving means comprises a portable drill.

8. A method as recited in claim 5, wherein said monolithic structure is formed from a plastic material of polyethylene.

9. A method as recited in claim 7, including the step of providing a gauge means to adjust the extended ends of said support bar to a predetermined distance outwardly from said side walls.

* * * * *